3,452,044
SYNTHESIS OF STEROIDAL PYRAZOLES AND
PYRAZOLINES
Seymour D. Levine, North Brunswick, and Frank L.
Weisenborn, Somerset, N.J., assignors to E. R. Squibb
& Sons, Inc., New York, N.Y., a corporation of
Delaware
No Drawing. Continuation-in-part of application Ser. No.
452,931, May 3, 1965. This application Oct. 25, 1967,
Ser. No. 677,879
Int. Cl. C07c *171/06;* A61k *17/06*
U.S. Cl. 260—310                         3 Claims

ABSTRACT OF THE DISCLOSURE

This invention relates to the preparation of novel steroidal pyrazoles and pyrazolines and new hydroxymethylene $\Delta^3$-A-norandostene intermediates useful in the preparation thereof. The pyrazoles and pyrazolines of this invention are physiologically active materials, possessing antiandrogenic activity. In addition these compounds are useful as sun-screening, anti-oxidant and anti-corrosive agents. They are also surfactants, and thus may be employed as emulsifiers and wetting agents.

---

This application is a continuation-in-part of applicants' copending application Ser. No. 452,931, filed May 3, 1965, now abandoned.

This invention relates to and has as its objective the provision of novel physiologically active steroids, and new intermediates useful in the preparation thereof.

The final products of this invention can be represented by the general formulae

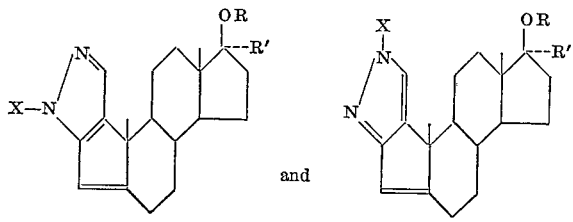

and and salts thereof, wherein R is selected from the group consisting of hydrogen and acyl; X is selected from the group consisting of hydrogen, lower alkyl, cycloalkyl, monocyclic aryl and monocyclic aryl-lower alkyl; and R' is selected from the group consisting of hydrogen and lower alkyl. Preferably R is hydrogen or acyl, R' is hydrogen or lower alkyl, and X is lower alkyl, cycloalkyl or monocyclic aryl.

The preferred acyl radicals are those of hydrocarbon carboxylic acids and less than twelve carbon atoms, and may be exemplified by the lower alkanoic acids (e.g., formic, acetic, propionic, butyric, valeric trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxylic aid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene) pentenoic acid], and the like.

The term "lower alkyl" as employed herein, includes both straight and branched chain radicals of less than eight carbon atoms, for instance, methyl, ethyl, propyl, butyl, pentyl, hexyl, heptyl, octyl, isopropyl, t-butyl, isobutyl, isohexyl, 4,4-dimethylpentyl 2,2,4-trimethylpentyl, and the like The term "monocyclic aryl" as employed herein contemplates monocyclic carbocyclic aryl radicals, for instance phenyl and substituted phenyl radicals, such as lower alkyl phenyl (e.g., o-, m- or p-tolyl, ethylphenyl, butylphenyl and the like, di(lower alkyl)phenyl (e.g., 2,4-dimethylphenyl, 3,5-diethylphenyl, and the like), halophenyl (e.g., chlorophenyl, bromophenyl, iodophenyl fluorophenyl) o-, m- or p-nitrophenly, dinitrophenyl (e.g., 3,5-dinitrophenyl, 2,6-dinitriphenyl, and the like), trinitrophenyl (e.g., picryl).

The terms "monocyclic cycloalkyl" and "monocyclic cycloalkenyl" include cyclic radicals containing from 3 to 6 ring members (e.g., cyclopropyl, cyclobutyl, cyclopentyl, cyclohexyl, cyclobutenyl and cyclohexenyl).

Salts coming with the purview of this invention include the pharmaceutically acceptable acid-addition and quaternary ammonium salts. Acids useful for preparing the acid addition salts include organic and inorganic acids. The inorganic acids include the hydrohalic acids (e.g., hydrochloric and hydrobromic acids), sulfuric, sulfamic, nitric and phosphoric acids. The organic acids include aliphatic monocarboxylic acids such as formic, acetic, propionic, pivalic, stearic and palmitic acids and the like; aliphatic hydroxy monocarboxylic acids such as gluconic, glycolic and lactic acids and the like; aliphatic lower alkoxy monocarboxylic acids such as methoxy-acetic and ethoxy-acetic acids and the like; aliphatic lower alkanoyl monocarboxylic acids such as pyruvic acid and the like; aliphatic halogeno monocarboxylic acids such as chloroacetic, dichloroacetic, trichloroacetic and bromoacetic acids and the like; aliphatic dicarboxylic acids such as oxalic, malonic, succinic, methylsuccinic, dimethylsuccinic, glutaric, α-methylglutaric, α,α-dimethylglutaric, β-methylglutaric, itaconic, homoitaconic, maleic, citraconic, homocitraconic, pyrocinchonic, xeronic and fumaric acids and the like; aliphatic hydroxy dicarboxylic acids such as malic and tartaric acids and the like; aliphatic lower alkoxy dicarboxylic acids such as α,β-dimethyloxysuccinic and ethoxymaleic acids and the like; aliphatic halogeno dicarboxylic acids such as chlorosuccinic and bromosuccinic acids and the like; aliphatic tricarboxylic acids such as aconitic and tricarballylic acids and the like; aliphatic hydroxycarboxylic acids such as citric acid and the like; aryl monocarboxylic or aryl aliphatic monocarboxylic acids such as benzoic, p-aminobenzoic, cinnamic, mandelic, salicylic, 4-aminosalicylic, 2-phenoxybenzoic, 2-acetoxybenzoic and nicotinic acids and the like; theophyllineacetic acid and the like as well as 8-halotheophyllineacetic acids such as 8-chlorotheophyllineacetic and 8-bromotheophyllineacetic and the like; aryl dicarboxylic acids such as phthalic and pamoic acids and the like; amino acids such as methionine, trytophane, lysine, arginine, aspartic, glutamic and hydroxyglutamic, and the like; organic sulfonic acids such as methane sulfonic, ethane sulfonic, benzene sulfonic, toluene sulfonic and camphor sulfonic acids and the like; hydroxy-alkane sulfonic acids such as 2-hydroxyethane sulfonic acids and the like; organic sulfamic acids such as cyclohexane sulfamic acid and the like as well as ascorbic acid. The quaternary salts coming within the purview of this invention include those formed with alkyl halides such as methyl chloride, isobutyl bromide, dodecyl chloride, cetyl iodide and the like; benzyl halides such as benzyl chloride and the like; and di-lower alkyl sulfates such as dimethyl sulfate and the like.

The final products of this invention are physiologically active substances useful in medicine. They are highly useful agents in inhibiting or counteracting the effects of androgens (being therefore called anti-androgens) such as testosterone. For example, abatement of skin eruptions in cases of hyperandrogenic acne (the acne condition resulting from the overabundance of an androgen such as testosterone) may be achieved by the peroral administration of the antiandrogens of this invention in dosages of from about 10 to 200 mg./kg. of body weight daily. They may also be administered systemically (e.g., subcutaneously) in a dosage of from about 2 to 60 mg./kg. of body weight daily. Further topical application may be employed in the treatment of this condition, utilizing, for instance a cream or lotion containing from about 1 to 25% of the final product of this invention.

As anti-androgens, the final products of this invention have been found to be useful in veterinary medicine. Male swine, the meat of which is usually rendered unpalatable by a characteristic odor developed by the mature animal which permeates the meat, may be treated with the final products of this invention in order to suppress the formation of the odor and hence render the meat more palatable. Likewise the caponizing of male chickens may be achieved without resort to castration by means of the administration of the final products of this invention. For these purposes they may be administered orally at a dosage of about 10 to 200 mg./kg. of body weight daily, or parenterally at a dosage of about 2 to 60 mg./kg. of body weight daily.

Perorally acceptable formulations can be prepared in the usual manner to provide an aqueous suspension, an elixir or a solid dosage unit form (e.g., tablet, powder or capsule), for example, two-piece hard gelatin capsules may be filled with a mixture of the active ingredient and excipients (e.g., starch, talc, stearic acid, and/or magnesium stearate). Also one piece gelatin capsules containing the same amount of medicament may be prepared using sufficient corn oil or other suitable vegetable oil, to render the compound capsulatable. Tablets may be prepared by using starch, lactose of other conventional excipients, and may be scored to enable the administration of fractional dosages, if desired. Any of the tableting material used in pharmaceutical practice may be employed. Liquid preparations may be in the form of suspension, emulsions, syrups or elixirs of the active substance in water or other liquid medium commonly used for making orally acceptable pharmaceutical formulations, such as liquid paraffin, or a syrup elixir base.

The final products of this invention may be formulated into a preparation suitable for topical administration in conventional manner with the aid of one or more carriers or excipients. Examples of types of topical formulation include ointments, creams, sprays, aerosols, and the like. Ointments and creams may, for example, be formulated with an aqueous or oily base with the addition of suitable thickening and/or gelling agents. Such bases may, for example, include water and/or an oil such as liquid paraffin or a vegetagle oil such as castor oil, arachis oil or the like. Various thickening agents may be employed in accordance with the nature of the base, for example, soft paraffin, aluminum stearate, cetostearyl alcohols, polyethylene glycols, woolfat, hydrogenated lanolin, and the like. Lotions may likewise be formulated with an aqueous or oily base and will in general also include various emulsifying agents, dispersing agents, suspending agents, thickening agents, coloring agents, perfumes, and the like.

In addition, the compounds of this invention (both intermediates and final products) are surface active agents which may therefore be employed in a variety of applications requiring such an agent. For example, the compounds of this invention may be employed as emulsifying agents in the preparation of lubricants, adhesives, polishes, wax compositions, nad the like. Further, these compounds are ultraviolet-absorbing materials and may be employed as sun-screening agents. They may also be employed as antioxidants and corrosion inhibitors for various hydrocarbons and mixtures thereof. As example of materials to which the compounds of this invention may be added for this purpose may be mentioned gasoline, hydrocarbon lubrication oils and greases, hydrocarbon solvents (e.g., toluene, kerosene) and the like.

Further, the hydroxymethylene intermediates of this invention find utility as plasticizers in various materials (i.e., ethyl cellulose, cellulose nitrate), for example, in the preparation of transparent films, lacquer films, coatings, such as fabric coatings and the like.

The final products of this invention may be prepared by the processes of this invention beginning with, as starting materials, compounds of the formula

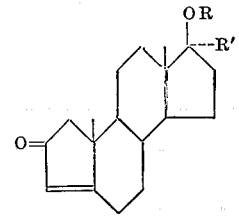

wherein R and R' are as hereinbefore defined. Among the suitable starting materials which may be employed in the practice of this invention may be included inter alia A-nortestosterone; 17α-methyl-A-nortestosterone; 17α-methyl-Δ³-A-norandrostene-2-one-17β-ol 17 acetate; Δ³-A-norandrostene-2-one-17β-ol 17 acetate; and other like materials known to the art.

The A-nor starting materials are treated with an alkylformate, for example, ethylformate, and an alkali metal hydride, such as sodium hydride or potassium hydride to yield 1-hydroxymethylene derivatives of the formula

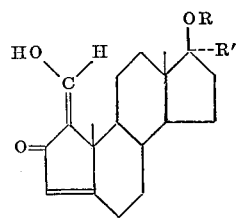

wherein R and R' are as hereinbefore defined, which are new compounds of this invention.

These 1-hydroxymethylene derivatives are then treated with a hydrazine of the formula XHNNH$_2$ wherein X is selected from the group consisting of hydrogen, alkyl, cycloalkyl and aryl, to yield the novel final products of the instant invention.

Among the hydrazines which may be employed in the practice of this invention may be included inter alia hydrazine; alkylhydrazines, such as methylhydrazine, ethylhydrazine, propylhydrazine or butylhydrazine, cycloalkylhydrazines, such as cyclopropylhydrazine or cyclobutylhydrazines; arylhydrazines, such as phenylhydrazine, halophenylhydrazine, for example, chlorophenylhydrazine, and bromophenylhydrazine, tolylhydrazine, dinitrophenylhydrazine, alkylphenylhydrazine, for example, benzylphenylhydrazine or ethylphenylhydrazine, naphthylhydrazine, nitrophenylhydrazine, picrylhydrazine, xylylhydrazine, and other like hydrazine derivatives.

The invention may be illustrated by the following examples:

Example 1.—1-hydroxymethylene-Δ³-A-norandrostene-2-one-17β-ol

A mixture of 1.0 g. of A-nortestosterone and 1.25 ml. of ethylformate in 5 ml. of dioxane and 25 ml. of benzene is treated with 450 mg. of sodium hydride (50% in mineral oil) and the reaction mixture stirred at room temperature under helium for 23 hours. Excess hydride is destroyed by the addition of 6 ml. of methanol and then 50 ml. of water is added. The layers are separated and the aqueous layer is extracted with benzene. The aqueous layer is acidified to pH 1 and extracted twice with ethyl acetate. The ethyl acetate extracts are washed with 8% salt solution, dried over sodium sulfate and evaporated to dryness. Crystallization of the residue from ether gives 416 mg. of 1-hydroxymethylene-Δ³-A-norandrostene-2-one-17β-ol, M.P. 160–164°. Several recrystallizations from ether-ethyl acetate gives the analytical sample, M.P. 190–192°, $[\alpha]_D^{29}$ −136° (EtOH; $\lambda^{EtOH}$ 252 mμ (11,300), 287 mμ (6,700); $\lambda^{EtOH+NaOH}$ 233 mμ (17,300), sh. 243 mμ (14,200) and 336 mμ (12,100).

Analysis.—Calcd. for $C_{19}H_{26}O_3$ (302, 40): C, 75.46; H, 8.67. Found: C, 75.41; H, 8.60.

Example 2.—Δ³-A-norandrostene-17β-ol-[1,2-C]-pyrazole

A mixture of 0.80 g. of 1-hydroxymethylene-Δ³-A-norandrostene-2-one-17β-ol and 1 ml. of hydrazine hydrate in 25 ml. of ethanol is refluxed for 21 hours. The reaction mixture is concentrated, diluted with water and extracted four times with chloroform and once with ethyl acetate. The combined organic exracts are washed with 8% salt solution, dried over sodium sulfate and evaporated to give a 0.61 g. residue. Chromatography of the residue on 50 g. of silica gel and elution with ethyl acetate-ether (2:1) gives after crystallization from ethyl acetate 177 mg. of Δ³-A-norandrostene-17β-ol-[1,2-C]-pyrazole, M.P. 223–225°. The analytical sample is prepared by recrystallization from ethyl acetate, M.P. 224—225.5°, $[\alpha]_D^{26}$ −49° (EtOH); $\lambda^{EtOH}$ 212 mμ (11,400), sh. 218 mμ (9,400), 249 mμ (9,600), sh. 300 mμ(322); $\lambda^{EtOH+HCl}$ 217 mμ (7,650), 262 mμ (12,000) and 300 mμ (328); $\tau^{Si(CH_3)_4}$ 9.15 (s., 18=Me), 8.83 (s., 19=Me) and 3.77 (s., 3=H).

Analysis.—Calcd. for $C_{19}H_{26}N_2O$ (298.41); C, 76.47; H. 8.78; N, 9.39. Found: C, 76.36; H, 9.00; N, 9.32.

Example 3.—1-hydroxymethylene-17α-methyl-Δ³-A-norandrostene-2-one-17β-ol

Following the procedure in Example 1 but substituting 17α-methyl-A-nortestosterone for A-nortestosterone, there is obtained 1-hydroxymethylene - 17α-methyl-Δ³-A-norandrostene-2-one-17β-ol.

Example 4.—17α-methyl-Δ³-A-norandrostene-17β-ol-[1,2-C]-pyrazole

Following the procedure in Example 2 but substituting 1-hydroxymethylene-17α-methyl-Δ³-A-norandrostene-2 - one-17β-ol for 1-hydroxymethylene-Δ³-A-norandrostene-2-one-17β-ol, there is obtained 17α-methyl-Δ³-A-norandrostene-17β-ol-[1,2-C]-pyrazole.

Example 5

Following the procedure of Example 2 but substituting a hydrazine of the formula $XHNNH_2$ for unsubstituted hydrazine, there is obtained a mixture of X-substituted 1′ N and 2′ N pyrazole final compounds which are separable into their individual components by thin layer chromatography on silica gel. The results obtained are reported in Table I below:

TABLE I

| $XHNNH_2$, X value | X-Substituted pyrazole mixture, X value |
|---|---|
| Methyl | Methyl |
| Ethyl | Ethyl |
| Propyl | Propyl |
| Butyl | Butyl |
| Cyclopropyl | Cyclopropyl |
| Cyclobutyl | Cyclobutyl |
| Phenyl | Phenyl |
| Benzyl | Benzyl |
| o-Chlorophenyl | o-Chlorophenyl |
| p-Bromophenyl | p-Bromophenyl |
| m-Tolyl | m-Tolyl |
| m-Nitrophenyl | m-Nitrophenyl |
| 2,4-dinitrophenyl | 2,4-dinitrophenyl |
| 2,4,6-trinitrophenyl | 2,4,6-trinitrophenyl |
| 2,3-dimethylphenyl | 2,3-dimethylphenyl |

Example 6.—Δ³-A-norandrostene-17β-ol-[1,2-C]-N-acetylpyrazole 17-acetate

A solution of 900 mg. of Δ³-A-norandrostene-17β-ol-[1,2-C]-pyrazole in 10 ml. of acetic anhydride is refluxed for 2 hours, then poured into ice-water, and extracted with chloroform. The chloroform extracts are washed with saturated sodium bicarbonate solution, 8% salt solution, dried over sodium sulfate and evaporated to give Δ³-A-norandrostene-17β-ol-[1,2-C]-N-acetylpyrazole 17-acetate.

Example 7.—Δ³-A-norandrostene-17β-ol-[1,2-C]-pyrazole 17-acetate

A solution of 500 mg. of Δ³-A-norandrostene-17β-ol-[1,2-C]-N-acetylpyrazole 17-acetate in 5 ml. of 75% (v./v.) acetic acid is refluxed for 1.75 hours. The solution is diluted with water and extracted with chloroform. The chloroform extracts are washed with saturated sodium bicarbonate solution, 8% salt solution, dried over sodium sulfate and evaporated to give Δ³-A-norandrostene-17β-ol-[1,2-C]-pyrazole 17-acetate.

What is claimed is:

1. A compound selected from the group consisting of steroids of the formulae

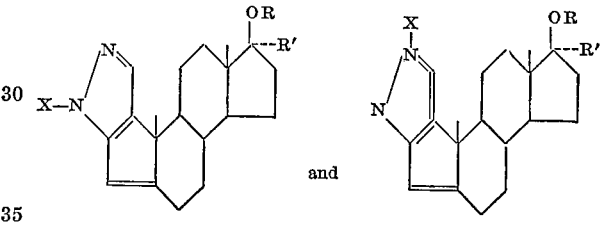

and wherein R is selected from the group consisting of hydrogen and the acyl radical of a hydrocarbon carboxylic acid of less than twelve carbon atoms selected from the group consisting of lower alkanoic acids, lower alkenoic acids, benzoic acid, toluic acid, phenyl lower alkanoic acids, cycloalkyl carboxylic acids, cycloalkenyl carboxylic acids, cycloalkyl-lower alkanoic acids, and cycloalkenyl-lower alkanoic acids, the cycloalkyl and cyclolkenyl radicals containing from 3 to 6 carbon atoms in the ring; R′ is selected from the group consisting of hydrogen and lower alkyl; and X is selected from the group consisting of hydrogen, lower alkyl, cycloalkyl, phenyl, lower alkyl phenyl, di(lower alkyl)phenyl, halophenyl, nitrophenyl, dinitrophenyl, and trinitrophenyl, wherein the cycloalkyl radical contains from 3 to 6 carbon atoms in the ring, and a pharmaceutically acceptable acid addition salt thereof.

2. Δ³-A-norandrostene-17β-ol-[1,2-C]-pyrazole.

3. 17α-methyl-Δ³-A-norandrostene-17β-ol-[1,2-C] - pyrazole.

References Cited

UNITED STATES PATENTS 3,030,358  4/1962  Manson _____ 260—239.5
3,134,792  5/1964  Kaspar et al. _____ 260—239.5
3,300,486  1/1967  Anner et al. _____ 260—239.5

HENRY R. JILES, Primary Examiner.

NATALIE TROUSOF, Assistant Examiner.

U.S. Cl. X.R.

44—63, 78; 99—2; 252—351, 357, 390, 391, 392, 396, 401, 402, 403, 407; 260—30.2, 32.8, 253, 311, 488, 569, 586, 999

PO-1050
(5/69)

UNITED STATES PATENT OFFICE
CERTIFICATE OF CORRECTION

Patent No. __3,452,044__ Dated __June 24, 1969__

Inventor(s) __Seymour D. Levine and Frank L. Weisenborn__

It is certified that error appears in the above-identified patent and that said Letters Patent are hereby corrected as shown below:

In column 1, line 53, "and", first occurrence, should read - - of - -. In column 2, line 10, "p-nitrophenly," should read - - p-nitrophenyl, - -; and on line 40, "dimethyloxysuccinic" should read - - dimethoxysuccinic - -. In column 3, line 69, "nad" should read - - and - -. In column 4, line 55, "halophenyl-hydrazine" should read - - halophenylhydrazines - -. In column 6, claim 1, that portion of the second formula reading

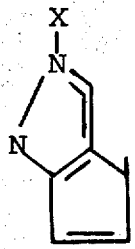    should read    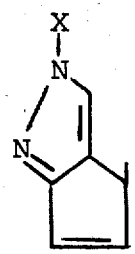

SIGNED AND
SEALED
APR 28 1970

(SEAL)
Attest:

Edward M. Fletcher, Jr.
Attesting Officer

WILLIAM E. SCHUYLER, JR.
Commissioner of Patents